United States Patent [19]

Valente

[11] Patent Number: 4,736,077

[45] Date of Patent: Apr. 5, 1988

[54] LOW OIL CUT OFF SWITCH

[76] Inventor: George Valente, 124 Ketcham Rd., Syosset, N.Y. 11791

[21] Appl. No.: 25,156

[22] Filed: Mar. 12, 1987

[51] Int. Cl.⁴ .............................................. H01C 35/18
[52] U.S. Cl. ..................... 200/84 C; 73/308; 73/322; 340/624; 200/81.4
[58] Field of Search ................. 335/206, 207; 73/308, 73/313, 322; 340/624; 200/84 R, 84 C, 61.2, 56 R, 81.4

[56] References Cited

U.S. PATENT DOCUMENTS

| 3,138,024 | 6/1964 | Pariser | 73/308 |
| 4,019,659 | 4/1977 | Deneen | 73/722 |
| 4,290,059 | 9/1981 | Noyes | 200/84 C |
| 4,473,730 | 9/1984 | Ida | 200/84 R |
| 4,647,740 | 3/1987 | Hansen, III | 200/84 C |

Primary Examiner—G. P. Tolin
Attorney, Agent, or Firm—Richard L. Miller

[57] ABSTRACT

A low oil cut off switch is provided and consists of a dual magnetic switch within a housing that is adjustably and slideably mounted to transparent tube of a rising stem fuel indicating gauge of a fuel storage tank. The dual magnetic switch which when attached by a magnetic fuel level indicating element within the fuel indicating gauge will first actuate an alarm to indicate a low fuel level in the storage tank and if undetected will next shut off fuel burner operation before the storage tank runs dry.

3 Claims, 1 Drawing Sheet

LOW OIL CUT OFF SWITCH

BACKGROUND OF THE INVENTION

The instant invention relates generally to liquid level indicators and more specifically it relates to a low oil cut off switch.

Numerous liquid level indicators have been provided in the prior art that are adapted to indicate high and/or low liquid level alert signals to personnel located at remote locations. For example, U.S. Pat. Nos. 4,290,059 to Noyes et al; 4,459,584 to Clarkson; and 4,473,730 to Ida all are illustrative of such prior art. While these units may be suitable for the particular purpose to which they address, they would not be as suitable for the purpose of the present invention as hereafter described.

SUMMARY OF THE INVENTION

A primary object of the present invention is to provide a low oil cut off switch that will overcome the shortcomings of the prior art devices.

Another object is to provide a low oil cut off switch that is a dual magnetic switch which when attracted by magnetic fuel level-indicating element will first indicate a low fuel level in storage tank and if undetected will shut off fuel burner operation before storage tank runs dry.

An additional object is to provide a low oil cut off switch that is adjustable and slideable on transparent tube of fuel gage of storage tank thus making the switch easily replaceable while at the same time permitting limit to be adjusted with ease.

A further object is to provide a low oil cut off switch that is simple and easy to use.

A still further object is to provide a low oil cut off switch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a view of a fuel tank with the invention shown incorporated there on.

DETAILED DESCRIPTION OF THE PREFERRED EMBODIMENTS

Figure 1:
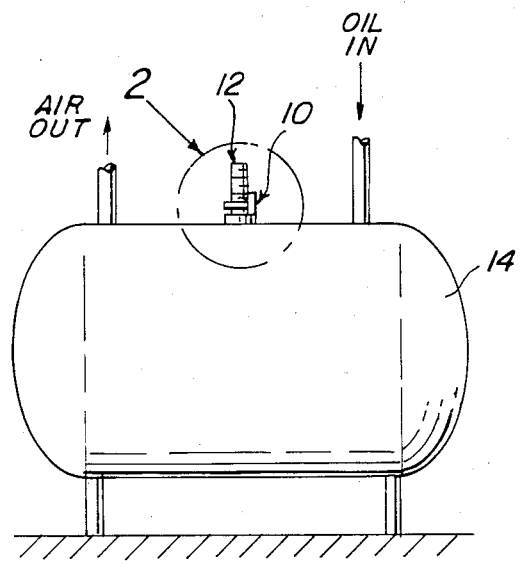
Figure 2:
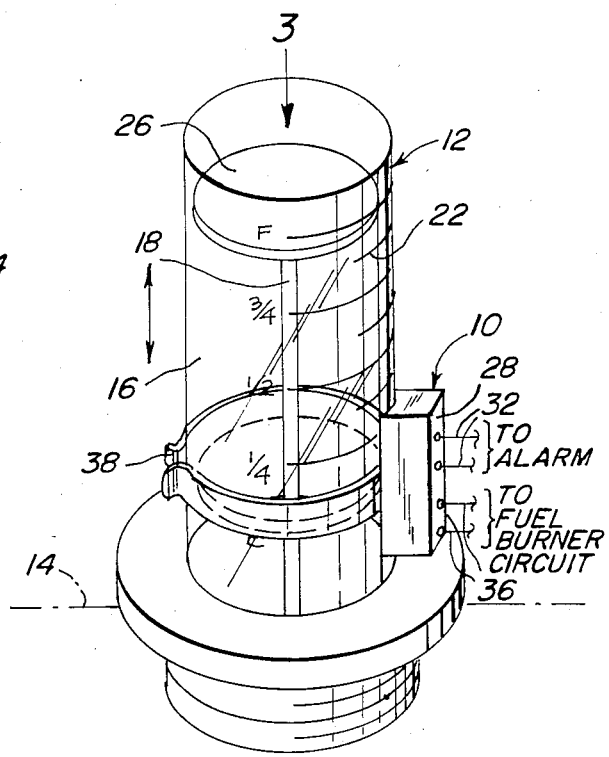
FIG. 2 is an enlarged perspective view as indicated by numeral 2 in FIG. 1 of the invention per se.
Figure 3:
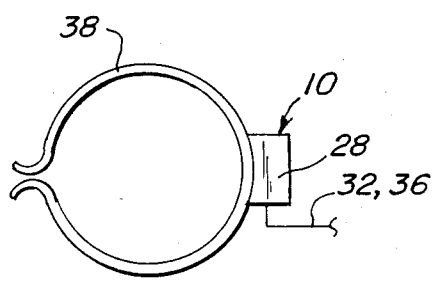
FIG. 3 is a top view as indicated by arrow 3 in FIG. 2 of just the clamp and switch portion of the invention.
Figure 4:
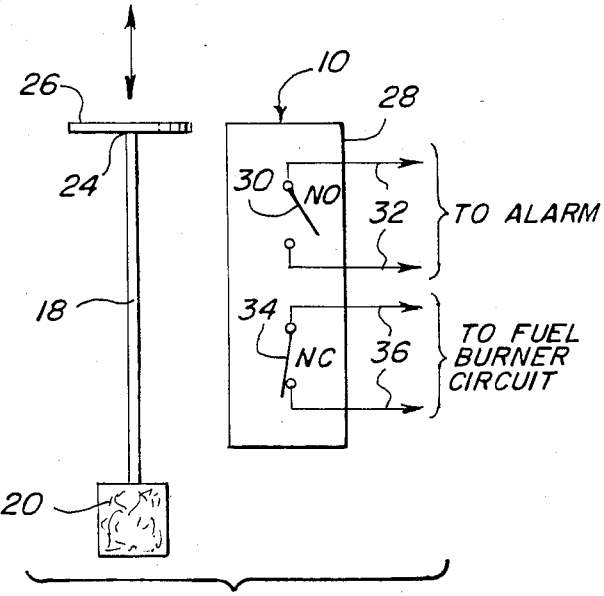
FIG. 4 is a schematic diagram of the invention.

Turning now descriptively to the drawings, in which like reference characters denote like elements throughout the several views, FIG. 1 through 4 illustrate a low oil cut off switch 10 for a rising stem fuel indicating gauge 12 used to measure quantity of liquid fuel remaining within a fuel storage tank 14. The indicated gauge 12 is of the type including a transparent tube 16, a vertical shaft 18 on a float 20 within the tube 16 and indicating markings 22 on the tube 16 for determining the quantity of fuel within the storage tank 14 corresponding to level of top 24 of the stem 18 in the tube 16.

The low cut off switch 10 consists of a magnetic fuel level-indicating element 26 affixed to the top 24 of the stem 18 and a housing 28 adjustably and slideably mounted to the transparent tube 16.

A first normally opened magnetically actuated switch 30 is mounted within the housing 28. The first switch 30 is selected so that it is magnetically actuated closed by the magnetic fuel level indicating element descending in the tube 16 to less them a predetermined distance away from the first switch 30. The first switch is mounted within the housing 28 in such a position that actuation of the first switch 30 by the magnetic fuel level-indicated element 26 will actuate an alarm (not shown) coupled by wires 32 to the first switch so as to provide an indication that no more than a predetermined quantity of fuel remains within the fuel storage tank 14.

A second normally closed magnetically actuated switch 34 is mounted within the housing 28 below the first switch 30. The second switch 34 is selected so that it is magnetically actuated open by the continued descent of the indicating element 26, that is when the magnetic fuel level indicating elements descend in the tube 16 to less than a predetermined distance away from the second switch 34. The second switch is mounted within the housing 28 in such a position that actuation of the second switch 34 by the magnetic fuel level indicating element 26 will dis-enable a fuel burner circuit (not shown) coupled by wires 36 to the second switch so as to shut off fuel burner operation before the storage tank 14 runs dry.

The first normally opened magnetically actuated switch 30 and the second normally closed magnetically actuated switch 34 typically may be reed switches. The alarm is positioned remotely from the fuel storage tank 14 and can be either an audio or video alarm system.

The housing 28 further contains a C-shaped spring clamp 38 that is adjustably and slideably mounted to the transparent tube 16 so that the predetermined quantity of fuel remaining in the storage tank 14 necessary to actuate the first and second switches 30 and 34 is variable, and may be set by the end user. Thus the housing 28 is easily mounted to and quickly removable from the transparent tube 16.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A low oil cut off switch in a rising stem fuel indicating gauge used to measure quantity of liquid fuel remaining within a storage tank, the indicating gauge being of the type including a transparent tube, a vertical shaft on a float within the tube and indicating markings on the tube for determining the quantity of fuel within the storage tank corresponding to the level of the top of a stem in a tube, said cut off switch comprising:
   (a) a magnetic fuel level indicating element affixed to the top of the stem;
   (b) a housing adjustable and slideably mounted to the transparent tube;

(c) a first normally opened magnetically actuated switch mounted within said housing, said first switch being selected so that it is magnetically actuated closed as said magnetic fuel level indicating element descends in the tube to less than a prefixed predetermined distance away from said first switch, said first switch being mounted within said housing in such a position that actuation of said first switch by said magnetic fuel level indicating element is adapted to actuate an alarm to be coupled to said first switch to provide an indication that no more than the predetermined quantity of fuel remains within the fuel storage tank; and (d) a second normally closed magnetically actuated switch mounted within said housing, said second switch being selected so that it is magnetically actuated open by said magnetic fuel level-indicating element when said magnetic fuel level-indicating element descends in the tube to less than a predetermined distance away from said second switch, said second switch being mounted within said housing in such a position that actuation of said second switch by magnetic fuel level-indicating element is adapted to disable a fuel burner circuit to be coupled to said second switch to shut off fuel burner operation before the storage tank runs dry.

2. A low oil cut off switch as recited in claim 1 wherein said first normally opened magnetically actuated switch and said second normally closed magnetically actuated switch are reed switches.

3. A low oil cut off switch as recited in claim 2 wherein said housing, further comprises a C-shaped spring clamp that is adjustably and slideably mounted to the transparent tube so that the predetermined quantity of fuel remaining in the storage tank necessary to actuate said first and second switches is variable and said housing is easily mounted to and quickly removable from the transparent tube.

* * * * *